United States Patent [19]

Keyes, IV et al.

[11] Patent Number: 4,561,311

[45] Date of Patent: Dec. 31, 1985

[54] BRIDGE EXCITATION FOR SENSOR USED ON A VORTEX SHEDDING FLOW METER

[75] Inventors: Marion A. Keyes, IV, Chagrin Falls; William L. Thompson, Montville, both of Ohio

[73] Assignee: The Babcock & Wilcox Company, New Orleans, La.

[21] Appl. No.: 576,041

[22] Filed: Feb. 1, 1984

Related U.S. Application Data

[63] Continuation-in-part of Ser. No. 329,633, Dec. 11, 1981, abandoned.

[51] Int. Cl.$^4$ ............................................... G01F 1/32
[52] U.S. Cl. .............................. 73/861.22; 73/861.24
[58] Field of Search ............ 73/861.22, 861.21, 861.24

[56] References Cited

U.S. PATENT DOCUMENTS 3,621,285  11/1971  Anderson et al. ................ 73/766 X
3,775,673  11/1973  Watanabe ........................ 73/861.22
4,281,553   8/1981  Datta-Barua .................... 73/861.24

FOREIGN PATENT DOCUMENTS 0115164  9/1979  Japan .............................. 73/861.17

OTHER PUBLICATIONS

P. K. Stein—"Pulsing Strain–Gage Circuits", Instruments & Control Systems, vol. 38, Feb. 1965, pp. 128–134.

Primary Examiner—Charles A. Ruehl
Attorney, Agent, or Firm—Vytas R. Matas; Robert J. Edwards

[57] ABSTRACT

A sensor circuit method of operating a vortex shedding flow meter utilizes A.C. single cycle bursts to intermittently drive a sensor which changes its state with the vortex shedding frequency. The bursts are spaced in time by an amount larger than the burst duration.

4 Claims, 9 Drawing Figures

BRIDGE EXCITATION FOR SENSOR USED ON A VORTEX SHEDDING FLOW METER

This is a continuation-in-part of application Ser. No. 06/329,633 filed Dec. 11, 1981, now abandoned.

BACKGROUND OF THE INVENTION a. Field of the Invention

The present invention relates in general to circuitry for vortex shedding flow meters and, in particular, to a new and useful circuit and method of driving the sensor connected to a vortex shedding flow meter to reduce energy consumption and heating of the sensor.

b. Description of the Prior Art

Vortex shedding flow meters are utilized to measure the volumetric flow of fluids by presenting a non-streamlined obstruction termed a bluff body in the flow path. As the flowing fluid separates around the obstruction, vortices are produced in the wake of the obstruction which alternate from one side of the obstruction to the other. The number of these vortices per unit time is directly proportional to the volumetric flow rate. The number of vortices thus can be counted to provide a measure of the flow rate.

It is known to utilize a continuously operating bridge circuit to sense the passing of these vortices. The bridge circuit usually has one resistor or other element which has a varying parameter such as resistance with the passage of each vortex. Circuit elements are connected to the bridge to count the thus sensed passage of vortices and to provide a signal which is proportional to the flow rate of the fluid to be measured.

Transformers are utilized to drive one side of the bridge and also to tap the signal from the other side of the bridge. When large driving voltages are utilized, the sensor bridge has a tendency to heat and lose accuracy due to drift and also impairs useful life. Moreover, many transmitter applications do not have this high power available on a continuous basis.

Thus an accurate vortex shedding frequency sensor was required which was drift free, over extended operating times.

SUMMARY OF THE INVENTION

The present invention solves the prior art problems as well as others by providing an improved method and circuitry for driving and sensing the signal from a sensing bridge utilized in a vortex shedding flow meter.

Rather than continuously driving the bridge, the present invention utilizes an A.C. signal to drive the bridge sensor in discrete single cycle bursts which are widely spaced. The sensor is thus activated to sense the passing of vortices only during discrete time intervals, providing a low average power to the sensor so that it remains in a stable state having increased product life.

Accordingly, an object of the present invention is to provide a method of operating a vortex shedding flow meter sensor circuit having a drivable sensor member with an output which varies at a vortex shedding frequency comprising, driving the sensor member in A.C. bursts, said bursts being equally spaced in time and being faster by a factor of approximately ten times the vortex shedding frequency cycle.

Since the sensor is driven at a high peak power, the sensitivity is improved, as it is directly related to the peak driving power. This achieves a main object of the invention.

Another object of the invention is to provide a vortex shedding flow meter circuit comprising, a sensor which varies its state with a vortex shedding frequency, a drive circuit connected to said sensor having means for applying A.C. single cycle bursts spaced in time by an amount greater than the duration of each burst to the sensor for producing a signal corresponding to the vortex shedding frequency.

Another object is to provide isolation between the sensor and the output circuit to prevent grounding interactions.

Another object of the invention is to provide a sensor circuit for a vortex shedding flow meter which is simple in design, rugged in construction and economical to manufacture.

The various features of novelty which characterized the invention are pointed out in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
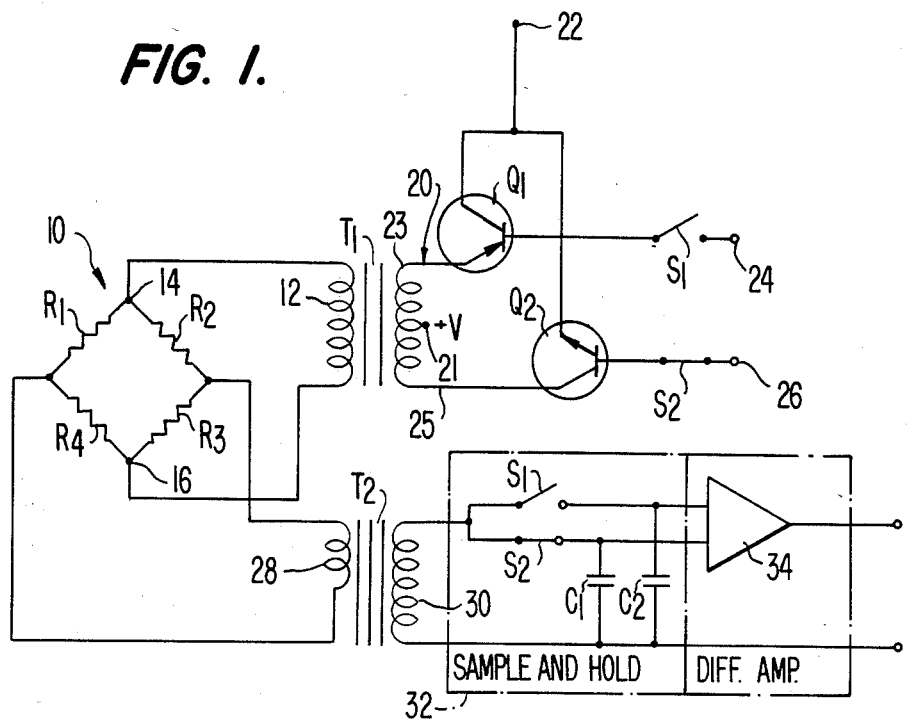
FIG. 1 is a schematic representation of a circuit utilized in accordance with the invention.

Referring to the drawings, FIG. 1 shows a typical circuit which can be utilized to practice the invention. A bridge generally designated 10 comprises four resistors $R_1$ through $R_4$. The bridge is utilized as a strain gauge for sensing the passage of vortices past a bluff body of a vortex shedding flow meter (not shown). One of the resistors $R_1$ of the bridge 10 acts as an active component of the bridge and reacts to the passage of a vortex by changing resistance. Another resistor, for example $R_4$, acts as a dummy resistor and cooperates with the two balancing resistors $R_2$ and $R_3$ in a known fashion.

The bridge drive 10 has a transformer $T_1$ with a winding 12 connected across the north and south terminals 14 and 16 respectively of the bridge 10. The other coil 20 of the drive transformer $T_1$ has a center tap 21 with opposite ends 23, 25 respectively, connected to collectors of a pair of switching transistors $Q_1$ and $Q_2$. The center tap 21 has a voltage V+connected thereto which induces a current which alternately flows either through switching transistors $Q_1$, or $Q_2$ to a common point 22. The emitters of the transistors $Q_1$ and $Q_2$ are connected to the circuit common point 22 and allow current flow thereto whenever the bases of transistors $Q_1$ and $Q_2$ are excited by first and second drive signals applied thereto from terminals 24 and 26 and switches $S_1$ and $S_2$. As is shown in FIGS. 3 and 4, respectively these drive signals are produced by the alternate actuation of the switches $S_1$ and $S_2$ and are combined to form the upper and lower half cycles of the FIG. 2 wave form by inverting the FIG. 4 wave form through the operation of the transformer $T_1$ in which the currents from $Q_1$ and $Q_2$ flow in opposite directions from tap 21 through coils 23 and 25 of the primary of 20. An RCA CD4066B assembly may be used for the switches $S_1$ and $S_2$.

In operation, the FIGS. 3 and 4 wave form are applied along terminals 24 and 26 to alternately drive the transistors $Q_1$ and $Q_2$. The A.C. signals designated 40 and 42 comprise greatly spaced single cycle bursts 44 and 46. A typical duty cycle of ten percent is provided to the bridge drive voltage applied along terminals 24, 26 where the duration of the pulse 44 or 46 is one tenth of the duration between pulses. The frequency of the bridge drive is selected to be at least five and preferably ten times that of the maximum vortex shedding frequency to be measured. The sensor in the form of bridge 10 is thus gated ON in single cycle and widely spaced bursts. This permits an increased drive level of approximately ten to one while permitting operation at low total power modes as dictated by a known 4–20 mA two-wire transmitter application.

Figure 2:
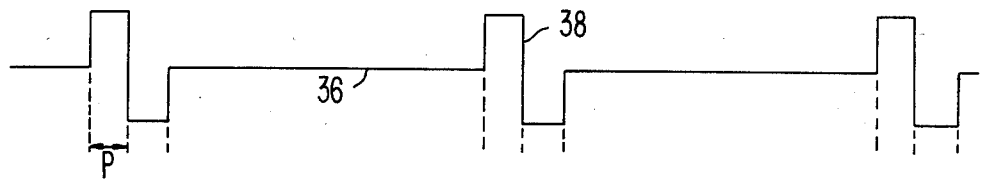
FIG. 2 shows a typical wave form which is applied to the bridge in the circuit of FIG. 1.
Figure 3:
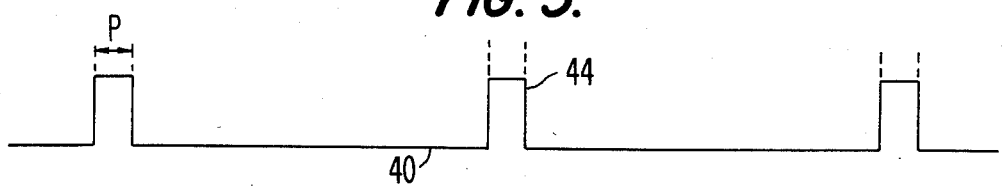
FIG. 3 shows the driving wave form applied along input 24 of the FIG. 1 circuit to the transistor $Q_1$.
Figure 4:
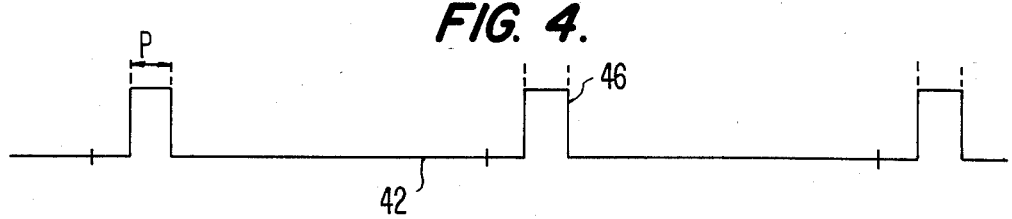
FIG. 4 shows the driving wave form applied along input 26 of the FIG. 1 circuit to the transistor $Q_2$.

The combined A.C. pulse as shown in FIG. 2 is formed by applying the stepped functions as shown in FIG. 3 along input terminal 24 and a stepped input of the type shown in FIG. 4 along input terminal 26. These stepped inputs activate the respective switching transistors $Q_1$ $Q_2$. Upon activation of the switching transistor $Q_1$ by the FIG. 3 pulse, the current from voltage V+ flows from the center tap 21 of the transformer $T_1$ primary coil 20 through the switching transistor $Q_1$ to the common 22. It will be understood that the common point 22 could also be at a negative D.C. voltage potential. This results in the formation of the top positive portion of the FIG. 2 pulse. The pulse may be somewhat rounded by the action of the transformer $T_1$. Similarly, when the FIG. 4 pulse activates the switching transistor $Q_2$, the flow of current is from the center tap 21 of the transformer $T_1$ primary coil 20 through $Q_2$ to the common point 22 which is 180° out-of-phase with the $Q_1$ directed flow resulting in the inversion of the FIG. 4 pulse to thus form the bottom half of the FIG. 2 square wave. Again, this wave in actuality may be somewhat rounded by the transformation through transformer $T_1$. The FIG. 2 wave form formed at coil 12 causes the intermittent activation of the sensing bridge 10 only during time the pulses P resulting in a more stable and accurate sensing of the vortex shedding frequency by the active resistor $R_1$ of the bridge.

Thus it is seen that the invention permits typically ten times higher bridge drives without introducing any additional heating problem over that which would be the case utilizing known lower but continuous drive levels.

The FIG. 2 square wave is shown as a perfect square wave, whereas, as mentioned, some rounding of the wave occurs due to the transformer $T_1$. However, it will be recognized that the use of a wide band transformer $T_1$ operating below saturation provides a wave form of a pattern approximately as shown in FIG. 2. The important thing to keep in mind is that the circuit is measuring and dealing with frequencies and minor distortion of the wave form is thus acceptable.

Figure 5:
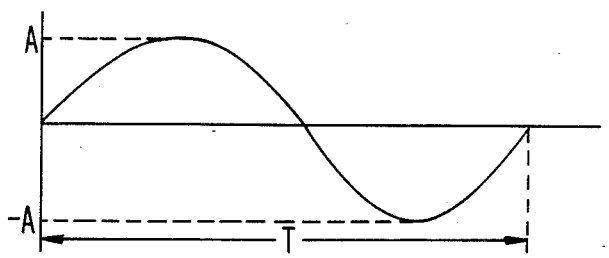
FIG. 5 shows the vortex shedding frequency $1/T$ sensed by resistor $R_1$ of the bridge in the circuit of FIG. 1.
Figure 6:
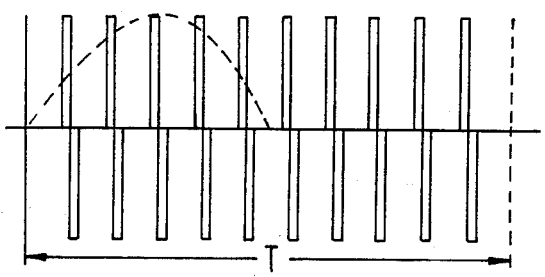
FIG. 6 shows the activation of the bridge of the FIG. 1 circuit during each vortex shedding period T, by the switches $S_1$ and $S_2$.
Figure 7:
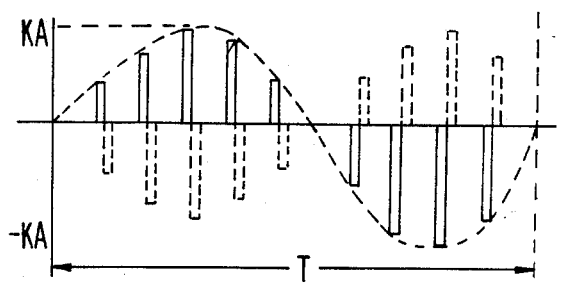
FIG. 7 shows the input from resistor R1, of the bridge to the coil 28 of transformer $T_2$ in the FIG. 1 circuit.
Figure 8:
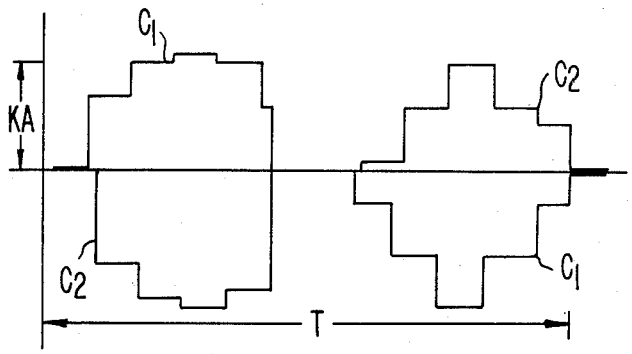
FIG. 8 shows the signal from the transformer $T_2$ as stored in capacitors $C_1$ and $C_2$ of the FIG. 1 circuit.

During the activation of the bridge 10, the output of the Wheatstone bridge will be a frequency as sensed by the variations in resistance of the active resistor $R_1$ due to the vortex shedding pressure applied to the active resistor $R_1$. This frequency as actually sensed by the resistor $R_1$, may be seen in FIG. 5. The signal to the primary coil 28 of transformer $T_2$, however, will be a frequency-related signal only corresponding to the vortex shedding frequency, since the bridge 10 will only be active during the FIG. 2 induced burst as are shown in FIG. 6. Note that there are approximately 10 bursts per period T of the vortex shedding frequency of FIG. 5. Thus the actual signal supplied to the coil 28 of transformer $T_2$ will be of the form shown as a solid line in FIG. 7. The amplitude, KA, of the signal of FIG. 7 is the product of the vortex shedding signal of FIG. 5, the bridge actuation signal of FIG. 6, and a scale factor determined by the resistors $R_1$, $R_2$, and $R_4$. The factor K lumps this proportionality. This signal shown as a solid line in FIG. 7 will be substantially duplicated on the secondary windings 30 of the transformer $T_2$ where it will be alternately applied to capacitors $C_1$ and $C_2$ of the sample and hold circuit 32 through the alternate actuation of the switches $S_1$ and $S_2$. Thus a wave form for $C_1$ and $C_2$ will be provided as is shown in FIG. 8. The difference amplifier 34 provides an output signal therefrom indicative of the difference between the levels of capacitors $C_1$ and $C_2$ which due to the negative nature of $C_2$ provides a signal having twice the amplitude A of either $C_1$ or $C_2$.

Figure 9:
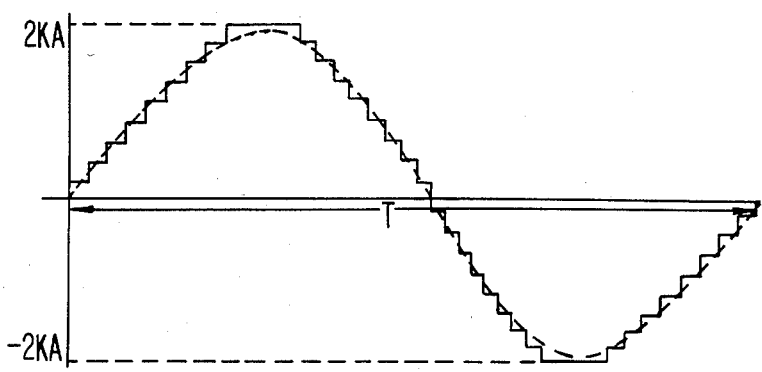
FIG. 9 shows the output signal of the differential amplifier measuring the difference between signals $C_1$ and $C_2$ in the FIG. 1 circuit.

This is accomplished by having the east and west terminals of bridge 10 connected across the coil 28 of the isolating signal transformer $T_2$. The FIG. 7 signal received from the bridge 10 is supplied by the coil 30 of the transformer $T_2$ to the sample and hold circuit 32. The switches $S_1$ and $S_2$ are connected to two inputs of the differential amplifier 34. The switches $S_1$ and $S_2$ operate in conjunction with capacitors $C_1$ and $C_2$ provide fullwave rectification of the output signal from transformer T as shown in FIG. 8. The differential amplifier 34 provides a circuit-common reference signal and has an output which shows the difference between the signals on capacitor $C_1$ and capacitor $C_2$. The wave form at the output of amplifier 34 is then a sampled representation of the vortex frequency as shown in FIG. 9 with samples taken at intervals determined by the FIG. 2 peaks.

While a specific embodiment of the invention has been shown and described in detail to illustrate the application of the principles of the invention, it will be understood that the invention may be embodied otherwise without departing from such principles.

What is claimed is:
1. A vortex shedding flow meter circuit comprising:
a sensor which varies its state with a vortex shedding frequency;
a drive circuit connected to an input of said sensor having means for applying A.C. single cycle bursts which are spaced in time by an amount greater than the duration of each burst to alternating opposite ends of said sensor for driving said sensor to change its state with the vortex shedding frequency;
wherein said sensor comprises a bridge having at least one element which changes its state with the vortex shedding frequency and balancing elements, said drive circuit comprising a bridge drive transformer having an output coil connected to said bridge and an input coil, said drive circuit being effective to apply a positive one half cycle of each burst to one end of said input coil and a negative one half cycle of each burst to an opposite end of said input coil.

2. A circuit according to claim 1, wherein said drive circuit comprises a first transistor connected to one end of said input coil and a second transistor connected to an opposite end of said input coil, each of said transistors having bases respectively connectable to determined positive and negative half cycles of each burst.

3. A circuit according to claim 2, wherein said output circuit comprises an isolating transformer having an input coil circuit connected to said bridge and an output coil, a sample and hold circuit connected to said output coil and a differential amplifier connected to said sample and hold circuit.

4. A method of operating a vortex shedding sensor circuit having a drivable sensor member which produces an output that varies at a vortex shedding frequency comprising:
driving the sensor member only during single cycle A.C. bursts which are spaced in time by an amount greater than a duration of each burst, wherein a frequency of said A.C. single cycle bursts is chosen to be at least five times a maximum of the vortex shedding frequency.

* * * * *

UNITED STATES PATENT AND TRADEMARK OFFICE
CERTIFICATE OF CORRECTION

PATENT NO.  :   4,561,311
DATED       :   12/31/85
INVENTOR(S) :   Marion A. Keyes IV and William L. Thompson It is certified that error appears in the above-identified patent and that said Letters Patent are hereby corrected as shown below:

Column 3, line 40, change "$Q_1Q_2$" to --$Q_1$ and $Q_2$--.

Column 4, line 25, after "$R_2$," add --$R_3$,--.

Column 4, line 45, after "$C_2$" add --to--.

Signed and Sealed this

Thirtieth Day of December, 1986

*Attest:*

DONALD J. QUIGG

*Attesting Officer*    *Commissioner of Patents and Trademarks*